United States Patent Office 2,925,345
Patented Feb. 16, 1960

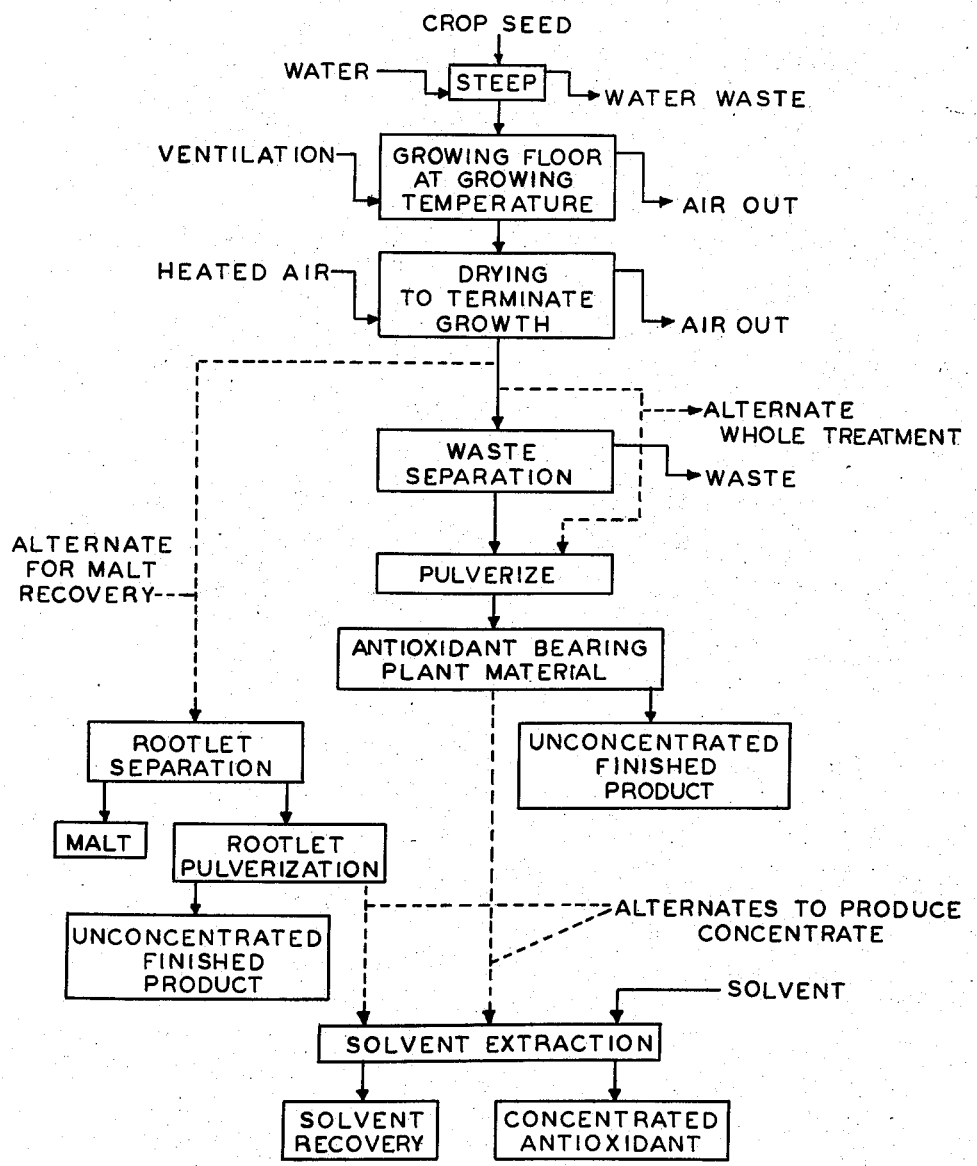

2,925,345

PREPARATION OF AN ANTIOXIDANT FROM ROOTLETS

Dwight L. Baker and Wilmer B. Dockstader, Milwaukee, Wis., assignors to Basic Products Corporation, Milwaukee, Wis., a corporation of Wisconsin Application February 17, 1956, Serial No. 566,131

6 Claims. (Cl. 99—163)

This invention relates to antioxidant substances, that is substances which exhibit an inhibiting effect upon the progress of the reaction between oxygen and organic materials, and it resides in a new antioxidant formed by inducing sprouting growth of seeds of seed propagated plants, arresting and terminating growth in the sprout stage, then drying to stabilize the developed antioxidant values.

Antioxidants are useful for delaying rancidification of edible fats and oils used for foods and for feeds, only if they themselves are harmless for human or animal consumption. The range of known and effective antioxidants, suitable for such purposes, is, therefore, somewhat restricted and the more effective of those available for such purposes have been limited in their utility because of their expense.

It is an object of this invention to provide, from edible plant sources, effective antioxidant substances which will be safe for consumption in conjunction with foods and feeds.

Another object of this invention is to provide new and effective antioxidant substances which are low in cost and which may be derived from plentifully available raw materials.

Another object of this invention is to provide a process for producing effective antioxidant substances from plant sources.

The foregoing and other objects and advantages of this invention will appear from the description following, which is set forth by reference to the accompanying drawing forming a part hereof.

In the drawing the single figure is a flow diagram of one instance of a process carried on in accordance with this invention.

In the practice of this invention antioxidant values are brought into being and rendered available in useable form by producing conditions under which plant seeds undergo sprouting growth and by then terminating such growth at a stage in which the antioxidant substance is present in effective amounts. Growth may be terminated by rapid drying conditions at moderate temperature so as to preserve the potential antioxidant value which has been elaborated by the plant. The sprouted plant material in this condition may be employed as such, as an effective antioxidant, or further steps may be carried on to extract, concentrate or isolate the active value.

As instances of suitable starting materials, we may employ such plant seeds as commercial grain, for example, wheat, rice, maize or barley, and in some instances rye although the seeds of nearly all seed propagated plants in some measure provide a source of antioxidant substance when treated in accordance with the invention. The starting seed, for example, barley, as above noted, may be first matured, cleaned, graded and then steeped in several changes of water. When furnished with water to the extent of about forty-five percent, it may then be spread in layers and held ventilated at growing temperature, say from 55° F. to 80° F. for from one to six days. At the end of the growing or sprouting period rootlet development is evident and the acrospire will have extended to a substantial degree. During the initial growth period the plant metabolism appears to be such as to develop a substantial content of antioxidant substance in the several plant parts since the unsprouted seed is a comparatively poor source. In the case of sprouted barley or malt little or none of the antioxidant material appears in the hull but other parts of the growing plant carry a substantial concentration and this is particularly marked in the rootlets. As growth of the plant continues the concentration of antioxidant substance in any given part of the plant begins to drop rapidly after the early sprouting stage. It is, therefore, desirable, in order to render the antioxidant value available, to terminate the plant growth or life process at an effective stage by means which are not destructive of the antioxidant content. This may be accomplished by rapidly drying the sprouted plant under conditions where its temperature will not exceed approximately 200° F.

The drying of the sprouted seed can be best accomplished by passing warmed or heated air rapidly over the seed under conditions where the wet bulb temperature remains within the limit above noted until the readily available water content of the plant begins to drop markedly. Thereafter the temperature of the drying air must be regulated more carefully in order to avoid destructive temperatures. It is preferred that the final drying air be held at a temperature below 200° F.; optimum results seem to occur where temperature is held at or below 120° F. at this stage.

At the conclusion of the drying process the sprouted seed or malt may be first treated for removal of rootlets and then for separation of the hull from the berry. Fatty foods or feed may be prepared by incorporating either the ground berry or ground rootlets or both, directly with the fatty material to be protected, since adequate antioxidant substance will be present in these plant parts to protect substantial quantities of fatty material. The added nutritional value of the accompanying plant substance is usually not objectionable.

In instances where the presence of added plant material is objectionable, a concentrate or extract of the antioxidant may be employed which may be obtained through solvent extraction. As an instance, the sprouted seed material may be subjected to extraction with a lower alcohol, such as methyl or ethyl alcohol, to remove an extract from which a concentrate may then be recovered by evaporation and further purified by extraction and recrystallization. The material, thus recovered, will be found effective in concentrations as low as 1 part per 10,000 when added to animal or vegetable fats of a type susceptible to rancidification.

To demonstrate the effectiveness of such a concentrate an accelerated oxidation test was conducted upon purified corn oil free of added protective material. A control portion of this oil was maintained at constant temperature at 100° C. by immersion of the vessel holding the same in a controlled temperature bath. Air was then bubbled through the heated oil. After five hours, marked deterioration, due to rancidity, became apparent.

As compared with the control portion, another portion of the same oil was treated under the same conditions, except that there was added to this portion 1 part in 10,000 of an antioxidant concentrate prepared in accordance with this invention. The oil thus treated withstood the accelerated oxidation treatment for more than eight hours before deterioration due to rancidity reached the level which occurred in the untreated oil after five hours.

The protective capacity of the antioxidant concentrate of this invention equals or exceeds the best results obtainable from the most effective and most expensive commercially available antioxidants which we have tested. The properties and use of such concentrates prepared by extracting malted seeds and portions thereof is disclosed and claimed in our copending application for Letters Patent, Serial No. 784,325, filed December 31, 1958, which is a continuation-in-part of the present application.

While it is preferred that a grain such as barley, wheat, oats or rice be employed as a source of material for the antioxidant of this invention, when the same is to be employed in an edible product, there are numerous uses for antioxidant substances for the protection of non-edible materials. Such substances find usefulness for delaying the aging of rubber, for inhibiting the formation of gums in petroleum products and for establishing and controlling the drying of protective film coatings and for other purposes. A grain, such as rye, may furnish a suitable source of non-edible antioxidant but it will be found that linseed and other crop seeds, such as soy beans and other commercial legumes, depending upon availability and cost, may, at times, be preferable sources.

While some fatty seeds, such as linseed and sesame may furnish a greater yield of antioxidant, its character may be such as to exert its protective action in company with undesirable contributions to flavor or over a shorter interval than is exhibited by antioxidant derived from other plants. It is necessary, therefore, to determine the use for which the antioxidant is required, before selecting the seed to be used as a source material.

One of the more exacting requirements of antioxidant is for protection of shortening used in bakery goods, such as crackers and cookies. Because of the cellular character of such materials and the large surface which is exposed, shortening contained becomes particularly susceptible to rancidification. This is aggravated by the fact that final cooking temperatures in the crust rise to a fairly high level. Antioxidant substances are, therefore, required which will protect against strong oxygen attack and which will, nevertheless, remain active and effective even though subjected to the high temperatures mentioned. For this purpose, we prefer the antioxidants which are derivable from barley, since they offer a particularly beneficial effect upon bakery materials.

We claim as our invention:

1. The method of inhibiting auto-oxidation in a composition comprising a fatty material, which method comprises admixing an amount of pulverized rootlets of malted seed with said fatty material sufficient to significantly inhibit the auto-oxidation of said material.

2. The method of claim 1, wherein the pulverized rootlets of malted seed are obtained from dried, malted barley.

3. The method of claim 1 wherein the fatty material comprises a shortening.

4. The method of claim 1 wherein the fatty material comprises a vegetable oil.

5. A composition comprising a fatty material subject to auto-oxidation and an amount of pulverized rootlets of malted seed sufficient to significantly inhibit the auto-oxidation of said fatty material.

6. The composition of claim 5 wherein the malted seed comprises malted barley.

References Cited in the file of this patent
UNITED STATES PATENTS

| | | |
|---|---|---|
| 2,627,464 | Kehetian | Feb. 3, 1953 |
| 2,694,011 | Frieden et al. | Nov. 9, 1954 |

OTHER REFERENCES

Taufel et al.: Fette und Seifen, 46, September 1939, pp. 554–560.